United States Patent [19]

Cook et al.

[11] 4,078,712

[45] Mar. 14, 1978

[54] WELDING OF ALUMINUM AND MAGNESIUM ALLOYS

[75] Inventors: Lloyd A. Cook, Parkersburg, W. Va.; Donald G. Shafer, New Westminster, Canada

[73] Assignee: Alforge Metals Corporation Limited, Orangeville, Canada

[21] Appl. No.: 679,307

[22] Filed: Apr. 22, 1976

Related U.S. Application Data

[63] Continuation-in-part of Ser. No. 542,758, Jan. 21, 1975, abandoned, which is a continuation of Ser. No. 402,556, Oct. 1, 1973, abandoned, which is a continuation of Ser. No. 284,849, Aug. 30, 1972, abandoned, which is a continuation of Ser. No. 78,453, Oct. 6, 1970, abandoned, which is a continuation-in-part of Ser. No. 528,697, Jan. 28, 1966, abandoned, which is a continuation-in-part of Ser. No. 698,483, Nov. 25, 1957, abandoned, which is a continuation-in-part of Ser. No. 618,189, Oct. 25, 1956, abandoned.

[51] Int. Cl.$^2$ .............................................. B23K 19/00
[52] U.S. Cl. .................................... 228/170; 228/196; 228/234; 228/263; 228/265

[58] Field of Search ........... 228/141, 243, 263, 173 A, 228/115, 234, 170, 196; 219/150 R, 152, 57

[56] References Cited

PUBLICATIONS

Tylecote, "The Pressure–Butt Welding of Light Alloy Bar", *Welding Research*, (U.K.) 1949, vol. 3, No. 1, pp. 2–16r.

Martin et al., "Thick Aluminum Plates", *Welding Journal*, Apr., 1953, pp. 161s–171s.

*Primary Examiner*—Donald G. Kelly
*Assistant Examiner*—K. J. Ramsey
*Attorney, Agent, or Firm*—Arne I. Fors

[57] ABSTRACT

This invention generally relates to a method for butt welding high strength aluminum and magnesium alloys. More particularly this invention pertains to a novel technique for welding (a) high strength aluminum alloys to each other, (b) high strength magnesium alloys to each other, and (c) high strength aluminum alloys to high strength magnesium alloys, under a combination of controlled pressure, temperature and time conditions.

3 Claims, 7 Drawing Figures

WELDING OF ALUMINUM AND MAGNESIUM ALLOYS

PRIOR APPLICATION

This application is a continuation-in-part of Ser. No. 542,758, filed Jan. 21, 1975; which is a continuation of Ser. No. 402,556, filed Oct. 1, 1973; which is a continuation of Ser. No. 284,849, filed on Aug. 30, 1972; which is a continuation of Ser. No. 78,453, filed Oct. 6, 1970; which is a continuation-in-part of Ser. No. 528,697, filed Jan. 28, 1966; which is a continuation-in-part of Ser. No. 698,483, filed Nov. 25, 1957; which is a continuation-in-part of Ser. No. 618,189, filed on Oct. 25, 1956; all of which are now abandoned.

BACKGROUND OF THE INVENTION

Within recent years a relatively simple method has been developed for welding together non-ferrous materials, particularly aluminum and copper. According to this method, two sections or bars of metal are made to flow together at room temperature by merely applying sufficient pressure at the juncture thereof, with no heat applied to bring about a weld. Although this method has been known and practiced for some time, it has been limited to the softer aluminum alloys and to parts having small cross-sectional areas (usually less than 0.5 square inches of cross-sectional area).

The aforementioned rather simple cold welding process, while suitable for the softer aluminum alloys and members of small cross-sectional areas, is not suitable for higher strength aluminum and magnesium alloys or for aluminum and magnesium members having a large cross-sectional area.

Many of these high strength alloys are far too brittle, particularly those of large cross-sectional area, to permit the extreme distortion and deformation necessary for cold pressure welding. This has presented a particularly troublesome problem, not only in non-heat treatable high strength alloys, such as aluminum alloys (for example those containing 0.3% silicon, 0.4% iron, 0.1% copper, 0.05% to 0.2% manganese, 4.5% to 5.6% magnesium, 0.05% to 0.2% chromium, 0.1% zinc, remainder aluminum and especially the high strength heat treatable aluminum alloys such as those which have the standard designations 2014, 2017, 6061, 7075, 2024, 5056) and magnesium alloys (such as those containing:

1. 3.0% aluminum, 0.45% manganese, 1% zinc, remainder magnesium;
2. 5.7% zinc, 0.55% zirconium, remainder magnesium); and in alloys of similar metallurgical characteristics.

Moreover, it has been practically impossible to obtain strong ductile welds in these alloys without post weld heat treatment. Such post weld heat treatment is cumbersome and impractical, and gives rise to undue distortion of the components. Even where post weld heat treatment has been possible, difficulties have been encountered in the form of weld cracking and low ductility. This problem is particularly acute in the aircraft and allied industries where large quantities of both high strength aluminum and magnesium alloys, and also, aluminum and magnesium alloys having large cross-sectional areas are utilized.

It is therefore an object of this invention to present a simple and effective process for the butt welding of high strength aluminum and magnesium alloys. A further object of this invention is to present a simple and effective process for the butt welding of high strength aluminum alloys to high strength magnesium alloys. Another object of this invention is to present a process for butt welding aluminum and magnesium alloys of large cross-sectional areas. A further object of this invention is to present a process for welding high strength aluminum and magnesium alloys wherein joint efficiencies of 85% to 100% are obtained. An additional object of this invention is to present a process for welding high strength aluminum alloys to high strength magnesium alloys wherein a ductile weld is produced which is not brittle and which presents no metallurgical notch effect. Another object of this invention is to present a process of welding aluminum and magnesium alloys which will permit the design of higher strength structures utilizing the higher strength alloys and/or a wide range of cross-sectional areas.

Various other features, objects and advantages of the invention will appear from the drawings taken in conjunction with the description, although it should be clearly understood that the invention is not limited to the specific details set forth.

Figure 1:
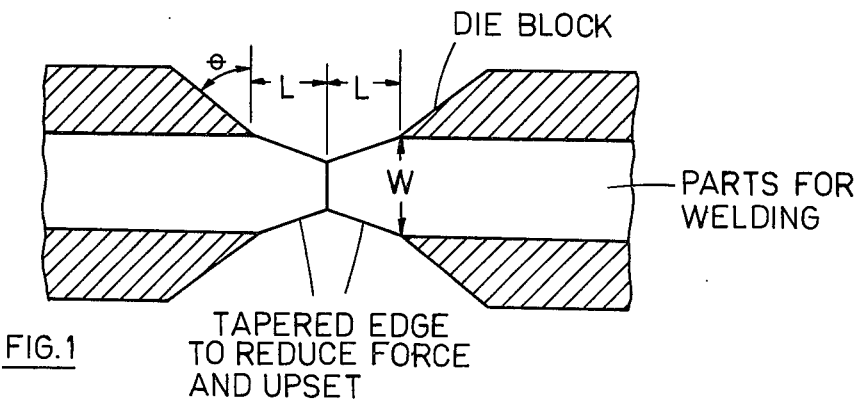
FIGS. 1 and 2 are cross-sectional views illustrating various ways in which two sections can be forge welded together in accordance with this invention.

The novel process for welding aluminum and magnesium alloys in accordance with this invention involves welding together two sections of aluminum or magnesium alloys under certain controlled pressure and temperature conditions.

More particularly, it has been found that high strength aluminum and magnesium alloys and/or aluminum and magnesium alloys and/or aluminum and magnesium alloys of large cross-sectional area may be successfully welded together by quickly heating the sections to be joined to between 200° F. and 600° F., and immediately thereafter welding the heated components together under the influence of high pressures.

For certain of these alloys elevated temperatures in excess of 600° F. can also be used satisfactorily to obtain high joint strengths. For example, in the case of the magnesium base alloy containing 5.7% zinc and 0.55% zirconium, joints with 100% joint efficiency have been produced with heating temperatures of 650° F., and in the case of the magnesium base alloy containing 3.0% aluminum, 0.45% manganese, and 1.0% zinc, joint efficiencies in excess of 100% have been obtained by using heat temperatures of 650° F.

It is further apparent that the optimum temperature range varies from one alloy to another depending on the metallurgical characteristics of each alloy. The upper temperature limit being that temperature which during the welding cycle will not be sufficiently high to overage or partially anneal the parent metal. Although this process is applicable to any temper of any aluminum alloy, some advantage may be expected in the case of the heat treatable alloys by welding them in the solution heat treated condition and subjecting them to an aging and stabilizing treatment after welding which has a tendency to improve the homogeneous nature of the weld and to relieve any stresses introduced during the welding operation.

A number of high strength aluminum alloys are known in the metallurgical arts, and although the teachings of this invention are believed to be applicable to all such high strength alloys, this disclosure is specifically directed to those aluminum alloys that have the following standard designations (see "Standards for Aluminum Mill Products", Eighth Edition, issued September, 1965 by The Aluminum Association): 2011, 2014, 2017, 2117, 2018, 2218, 2618, 2219, 2024, 2025, 3003, 5052, 5252, 5652, 5154, 5254, 5454, 5155, 5056, 5356, 5456, 5257, 5457, 5557, 5657, 5083, 5086, 6101, 6201, 6003, 6011, 6151, 6951, 6053, 6253, 6061, 6062, 6262, 6063, 6463, 6066, 7001, 7093, 7072, 7075, 7076, 7277, 7178, and 7079.

The teachings of this invention are also applicable to the high strength magnesium alloys and specifically the following magnesium alloys:

a. 3.0% aluminum, 1.0% zinc, remainder magnesium (AZ31B);
b. 6.5% aluminum, 1.0% zinc, remainder magnesium;
c. 5.7% zinc, 0.55% zirconium, remainder magnesium (ZK60A alloy);
d. 3% aluminum, 0.45% manganese, 1.0% zinc, remainder magnesium.

These high strength alloys are presently of the greatest commercial interest.

There are three main requisites for this novel process. These are as follows:

1. Clean edge faces to be welded must be as free of oxide and absorbed gases, films, and foreign particles as possible.

2. The edges to be butt welded must be heated sufficiently to permit the required plastic flow to occur in the welding operation. The surface condition must not be altered during heating such as by the use of high temperatures and/or prolonged heating periods since this would prevent a good weld from being formed. Heating must therefore be controlled below overaging, recrystallization and annealing temperatures for a period of time of less than 1 minute.

3. Sufficient upset must be obtained to permit a bond to be formed between the two members. Upset must be sufficient to allow an increase of interface area of from about two to less than four times that of the original mating surfaces. This stretching of the clean interfaces is an essential and critical factor for successful welding.

It is essential that the surface condition of the area to be welded be clean prior to welding. If the area to be welded contains deleterious materials it can be cleaned by either machining and/or physical means. The use of files, wire brushes, dry machining, etc., have been found satisfactory. Unless such cleaning treatments are employed, there is a considerable risk that a faulty weld will result if the said area to be welded contains deleterious oxides, grease, adsorbed films, moisture, or other objectionable foreign matter.

One of the novel aspects and requirements of this method is the amount of upset required. Specifically, it is not the amount of material that is upset, but an adequate increase in the area of the mating interface which is required. The initial area of the interface is defined as the cross-sectional area of the pieces to be butt welded. The final area of the interface is defined as the area of the total interface (or weld) after upset has taken place.

The development and study of this novel process have shown that to obtain a strong weld requires that the final area of the interface be at least about two to up to four times the initial area. Larger values are unnecessary in that excessive forging pressures are required and the additional upset is wasteful of material.

The temperature at between 200° F. and 650° F. must be carefully controlled as to time, since if high strength alloys are heated for too long a time at these temperatures an undesirable decrease in the strength of the alloy occurs. The exact time during which welded sections can be heated within the specified temperature range, of course, depends upon the original strength and temper of the alloy and the amount of loss in strength which can be tolerated. When heating temperatures of about 500° F. are employed, for example, it is preferable to maintain this temperature for less than a minute. Since the optimum time, the optimum temperature, and the optimum amount of upset for a given cross section are interdependent rather than independent factors, it will be appreciated by those skilled in the art that the optimum combination of conditions in order to obtain the best possible product will sometimes require a limited amount of experimentation within the range of temperatures, times, amount of upset, and pressure herein specified.

Figure 2:
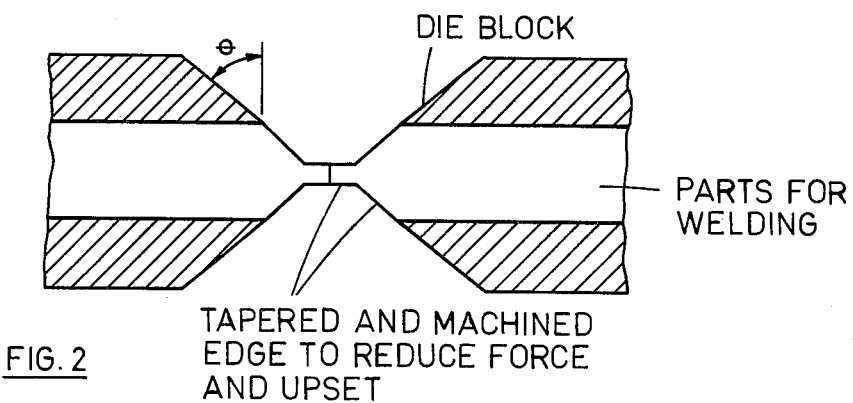

The edges, i.e. ends, to be butt welded preferably are tapered, as shown in FIGS. 1 and 2 of the drawings, to reduce the welding force and to minimize the amount of upset. The length of each tapered edge should be less than the thickness of the material welded to minimize the amount of metal upset. The tapered edges to be welded are aligned with each other to obtain the desired resolution of welding forces and to obtain upset of the metal in a lateral direction.

The invention will be illustrated by the following specific examples:

EXAMPLE 1

The faces of two sections of high strength aluminum alloy (0.5% silicon, 0.7% iron, 1.2% to 2.0% copper, 0.3% manganese, 2.1% to 2.9% magnesium, 0.18% to 0.4% chromium, 5.1% to 6.1% zinc and 0.2% titanium, remainder aluminum) in the fully heat treated and aged condition were dry machined to a fresh surface while at the same time making sure to keep all oil and foreign particles from the freshly machined surface. The two sections were then each placed in the dies of a hydraulic press and an upset pressure of 300,000 pounds applied after the sections had been heated to a temperature of 450° F. The initial area was 2.25 square inches and the final interface area was 6.3 square inches. This resulted in an increase in the area of interface of 2.8 times. The two sections were maintained at the above-mentioned temperature for less than a minute. The flash resulting from the lateral upset was trimmed off and tensile bars prepared for testing. The tensile bars exhibited joints of 99% efficiency.

The results which were obtained by carrying out similar welding operations on other aluminum alloys are set forth in Table I.

The results which were obtained by carrying out similar welding operations on other magnesium alloys are set forth in Table II.

Results which were obtained from carrying out similar welding operations between aluminum alloy 6061-T6 and magnesium alloy ZK60A-T5 are set forth in Table III.

TABLE I
WELD CONDITIONS & PROPERTIES ON SAMPLES OF ALUMINUM ALLOYS

| Aluminum Alloy* | Cross Sectional Area (Sq. In.) | Welding Pressure (Tons) | ** Approx. Upset (In.) | Heat Temp. (° F.) | Time at Temp. (Min) | Ultimate Tensile Strength (psi) | Joint Efficiency % |
|---|---|---|---|---|---|---|---|
| 6061-T6 | 2.25 | 100 | ⅜ | 450 | 1½ | 42,500 | 95.5 |
| 6061-T6 | 2.25 | 125 | ⅜ | 400 | 1½ | 42,000 | 97.0 |
| 6061-T6 | 2.25 | 150 | ⅜ | 300 | 1½ | 44,500 | 100.0 |
| 6061-T6 | 2.25 | 180 | ⅜ | 200 | 2 | 44,500 | 100.0 |
| 7075-T6 | 2.25 | 140 | ⅜ | 450 | 1½ | 76,000 | 94.0 |
| 7075-T6 | 2.25 | 150 | ⅜ | 450 | ½ | 80,000 | 99.0 |
| 7075-T6 | 2.25 | 170 | ⅜ | 400 | ½ | 80,000 | 99.0 |
| 7075-T6 | 2.25 | 140 | ⅜ | 480 | ½ | 79,000 | 98.7 |
| 7075-T6 | 1.5 | 95 | ⅜ | 450 | ½ | 80,000 | 99.0 |
| 7075-T6 | 3.2 | 200 | ⅜ | 450 | ½ | 80,000 | 99.0 |
| 2024-T6 | 2.25 | 150 | ⅜ | 450 | ½ | 66,000 | 97.0 |
| 2014-T6 | 2.25 | 150 | ⅜ | 450 | ½ | 67,000 | 98.5 |
| 2017-T6 | 2.25 | 150 | ⅜ | 450 | ½ | 61,000 | 98.5 |
| 5083-H113 | 2.25 | 150 | ⅜ | 450 | ½ | 46,000 | 100.0 |
| 5456-H111 | 2.25 | 150 | ⅜ | 450 | ½ | 47,000 | 100.0 |

*The aluminum and magnesium alloys referred to by number in these tables represent sepcific compositions which are well known by those skilled in the metallurgical arts, and the compositions will not be set forth here since they are defined by reference texts and published articles (e.g. 1948 Edition of the Handbook of the American Society for Metals).
**The approximate upset measured in inches is the amount by which each specimen is shortened in the welding operation. Thus, if the original length of the part is LO and the final length after welding is $L_1$, then the upset is $L_0 - L_1$.

TABLE II
WELD CONDITIONS AND PROPERTIES ON SAMPLES OF MAGNESIUM ALLOYS AZ31B & ZK60A ¾" DIAMETER EXTRUDED ROD

AZ31B-F

| Weld Temp. ° F. | Time at Temp. (sec.) | % Elong. | Tensile Yield Strength (psi) | Ultimate Tensile Strength (psi) | Joint Efficiency (%) |
|---|---|---|---|---|---|
| 575 | 30 | 12.0 | 19,100 | 52,400 | 135 |
| 600 | 30 | 14.0 | 18,500 | 50,000 | 129 |
| 650 | 30 | 13.0 | 18,000 | 47,300 | 122 |
| 550 | 30 | 14.0 | 18,900 | 51,000 | 131 |
| Parent Metal — no weld | | 15.0 | 31,000 | 38,800 | — |

ZK60A-T5

| | | | | | |
|---|---|---|---|---|---|
| 600 | 20 | 9.0 | 32,600 | 50,000 | 101 |
| 500 | 20 | 14.0 | 32,800 | 51,700 | 105 |
| 450 | 18 | 11.0 | 29,900 | 48,900 | 99 |
| 415 | 15 | 11.0 | 29,100 | 49,600 | 100 |
| 450 | 15 | 10.0 | 29,800 | 50,200 | 101 |
| Parent Metal — no weld | | 19.0 | 38,800 | 49,300 | — |

TABLE III
TEST RESULTS OF WELDS BETWEEN 6061-T6, ALUMINUM ALLOY & ZK60A-T5, MAGNESIUM ALLOY

| Piece No. | % Elong. | Tensile Yield Strength (psi) | Ultimate Tensile Strength (psi) | Joint Efficiency (%) |
|---|---|---|---|---|
| 1 | 6.0 | 34,700 | 46,800 | 95 |
| 2 | 5.0 | 34,000 | 46,300 | 95 |

For the welding of aluminum to high strength magnesium alloys by the process of this invention it is necessary to carefully obtain a suitable heat balance between the two materials so that the yield strength and flow characteristics of the two alloys are sufficiently similar that a uniform flow takes place by both bars. This is essential to obtain satisfactory welding conditions. Thus, it is necessary to heat each specimen to a temperature at which it will flow satisfactorily to produce a good weld; secondly, it will not be overheated or overaged; and thirdly, it will have yield strengths and flow characteristics similar to the other member to which it is being joined. These conditions hold true whether one is welding one aluminum alloy to a different aluminum alloy, an aluminum alloy to a magnesium alloy, or a magnesium alloy to a different magnesium alloy.

Table IV shows the results of test data obtained using ¾ inch diameter aluminum test bars of the nominal composition 0.5% silicon, 0.7% iron, 1.2% to 2.0% copper, 0.3% manganese, 2.1% to 2.9% magnesium, 0.18% to 0.4% chromium, 5.1% to 6.1% zinc, 0.2% titanium, remainder aluminum. Samples of this alloy were welded in the fully heat treated and aged condition at various temperatures using heating and welding times of ½ minute in each case with an upset on each piece of ¾ inch. The resulting data shown in Table IV aptly demonstrates the fact that for each alloy a minimum temperature exists below which no forge weld can be obtained, and a maximum temperature exists beyond which the decrease in properties of the weld obtained are excessive as a result of overaging or partial annealing. Thus, in the case of this particular alloy, it can be seen that a minimum temperature of about 375° F. is necessary in order to obtain a satisfactory weld, and that a maximum temperature of 450° F. is used for this time cycle of ½ minute since higher temperatures will result in a decreasing joint efficiency and lower joint properties as a result of the overaging characteristics. Similar data can be presented for each of the aluminum and magnesium alloys mentioned for a range of time cycles and also for alloy combinations of aluminum and magnesium. It is also apparent from the work done to date that similar maximum and minimum temperature values for satisfactory pressure welding, to obtain 100% joint efficiency, exist for alloy systems other than those of the aluminum and magnesium alloys presented here.

The strength of the welds produced in accordance with this invention may in some instances be improved in strength and ductility by subsequent heat treatment if the original welding conditions were not at the optimum values. This is particularly so if the members to be welded are in the solution heat treated condition during the welding operation, and the final low temperature aging treatment to the T6 condition is performed after welding. In this case 100% joint efficiency results. Typical results obtained from heat treating one lot of samples are shown in Table V.

TABLE IV
EFFECT OF WELDING TEMPERATURE ON THE ULTIMATE TENSILE STRENGTHS OF WELDS MADE IN 7075-T6 ALUMINUM ALLOY, OTHER CONDITIONS REMAINING CONSTANT

| Sample No. | Welding Temp. | Ultimate Tensile Strength psi | Remarks |
| --- | --- | --- | --- |
| Control Sample | No weld | 81,900 | |
| 1 | 300° F. | — | No Weld* |
| 2 | 350° F. | — | No weld* |
| 3 | 375° F. | 81,600 | Good Weld |
| 4 | 400° F. | 81,400 | Good Weld |
| 5 | 425° F. | 81,400 | Good Weld |
| 6 | 450° F. | 80,600 | Good Weld |
| 7 | 475° F. | 78,700 | Good Weld |
| 8 | 500° F. | 74,900 | Good Weld |
| 9 | 550° F. | 72,200 | Good Weld |
| 10 | 600° F. | 67,000 | Good Weld |
| 11 | 650° F. | 64,000 | Good Weld |
| 12 | 700° F. | 59,000 | Good Weld |

*Optimum welding range for this alloy 375° F. to 450° F. under the welding conditions of time and upset used here. Cracking occurred at the interface and in the flash. No satisfactory weld bonding was obtained.

TABLE V
TYPICAL WELDS MADE AT HIGHER THAN OPTIMUM TEMPERATURES & HEAT TREATED AFTER WELDING

| Specimen No. | Aluminum Alloy | Ultimate Tensile Strength psi | Tensile Yield Strength psi | % Elongation In 4D |
| --- | --- | --- | --- | --- |
| 1 | 7075-T6 | 74,500 | 65,100 | 4.0 |
| | | (sample tested as welded) | | |
| 2 | Parent Metal 7075-T6 | 80,700 | 64,100 | 13.0 |
| | | (parent material, no weld) | | |
| FOLLOWING SPECIMENS RE-HEAT TREATED AFTER WELDING | | | | |
| 3 | 7075-T6 | 79,000 | 69,200 | 12½ |
| 4 | 7075-T6 | 79,300 | 69,200 | 10.0 |

The joint efficiencies referred to in Table I were calculated by dividing the strength of the weld by the strength of the parent metal and multiplying by 100%. Failure occurred away from the joint in the parent metal in all cases.

The method of this invention invariably produces considerable "upsetting" of the two sections to be joined. The terms "upset" and "upsetting" are, of course, well known to those skilled in the metallurgical art. In practicing the instant invention it has been found preferable to upset each of the sections to be joined in an amount substantially equal to the thickness of the thickest section of that member. However, the amount of metal upset is only important in that it determines, for a given set of clamping dies, the increase in area of the interface, which has previously been specified as a minimum increase of two to less than four times the original mating surface area. By the proper design of the clamping dies, the length of upset material per part welded needed to obtain the correct increase in area of the interface can be reduced to somewhat less than the diameter or thickness of the metal.

In welding or uniting two sections of aluminum or magnesium in accordance with the teachings of this invention, the shape of the dies which hold the sections is an important factor. Since this process results in a considerable upset of the sections to be joined, it is necessary that the upset metal be permitted to flow laterally with as little resistance or restriction as possible. Resistance to lateral flow of the upset material is minimized if the dies are constructed in such a manner that the annular abutting surface of each die slopes backwardly away from the nearest point of contact between opposed dies. However, any die shape which permits free flow of the upset material in a lateral direction is quite satisfactory.

Where it is necessary and desirable to reduce the amount of upset, the upsetting forces, and in some cases to simplify die design, this can be done by proper design of the joint itself. Our early techniques involved placing the two samples to be welded in suitable dies, cleaning the surfaces of the two samples prior to upset, and upsetting the specimens in an amount approximately equal to the section thickness of the specimen. If too much of the parent metal section to be welded is projected beyond the die, buckling will occur and good welding will be difficult to obtain. This technique resulted in a considerably increased size of flash which, because of the nature of the dies, generally required a considerable increase in pressure requirements. Thus, it has been found by the use of suitable joint designs such as is shown in FIG. 1 of the accompanying drawings, by tapering the two sections to be joined in a triangular shape with "L" indicating length of taper and "W" indicating width or thickness of part welded, several major advantages are obtained:

1. It is no longer necessary to use as much material in the upset in order to obtain a successful weld, so that the length of upset can now be somewhat less than the thickness of the material and a metal saving results.

2. Because of the amount of flash required with this joint design is reduced, lower pressures are necessary, and the joint interface can be heated more rapidly to welding temperature.

3. Slightly higher temperatures can be used without harmfully affecting the final properties of the weld.

For example, in the welding of ¾ inch diameter aluminum bar of the 7075-T6 composition and temper a cross sectional area of 0.442 square inches of bar resulted in a flash diameter of 1.6 inches and a flash area of 2.02 square inches. With modified joint design, i.e. tapered edges according to the invention, the flash diameter was reduced to 1.2 inches and the area of flash reduced to 1.13 square inches which made it possible to perform the same weld with just half the pressure previously required. Thus, with square edges without tapering, welding pressures of 80 tons were required for this particular application, whereas by properly beveling the sections to be joined, weld forces of 40 tons were used to obtain equivalent welds.

FIG. 2 shows an alternate type of design where machining is possible. A considerable reduction in the amount of material upset and the forces required is obtained, and in some cases welds have been made with this type of joint without the assistance of any dies except to hold the samples in position. Little or no flash was produced at the die face.

By employing elevated temperatures locally in the weld area only in accordance with this invention, the pressure necessary to unite two abutting sections of alloy are reduced and die design can be simplified.

The heating of the ends to be united may be accomplished by any desired method such as induction heating, resistance heating, etc., but heating by an oxyacetylene flame or heated platens is generally preferable because of its economy and simple equipment requirements.

Our process is ideally suited for the fabrication of a wide range of non-ferrous metal products and is particularly well suited to those alloys recited above recited above wherein previously it has been impossible to obtain high joint strengths in large cross-sectional areas of materials to be joined. For example, one of the major problems in the fabrication of aluminum wheel rims for automobiles and trucks has been the development of a suitable method for butt welding the two ends of the rim together to obtain a high joint efficiency, good ductility, material preferably free of any cast metal interface, and joint characteristics similar to those of the parent material. A further problem has been the development of a suitable technique for joining the wheel web to the rim. Our process now makes it possible to use any of a range of high strength aluminum or magnesium alloys for this application and obtain joint strengths and ductility which are ideally suited for this application.

Figure 3:
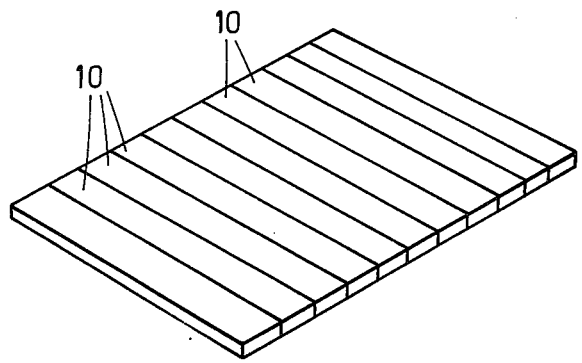
FIG. 3 is a perspective view of a plurality of narrow alloy panels welded together in accordance with the invention.

Another application where our process is ideally suited is for the fabrication of large panels for aircraft and transportation applications. Utilizing the advantages of our process it is now possible to fabricate large panels by starting with a plurality of small extruded panels 10 and joining them toghether to form one continuous panel with properties at the joint interface equivalent to those of the parent material and in a wide range of high strength alloys (see FIG. 3). Using a similar type of joint design, longitudinal seam welds and welds of headers can be made for a range of chemical tank applications which were previously difficult or impossible in the high strength alloys mentioned above.

Figure 4:
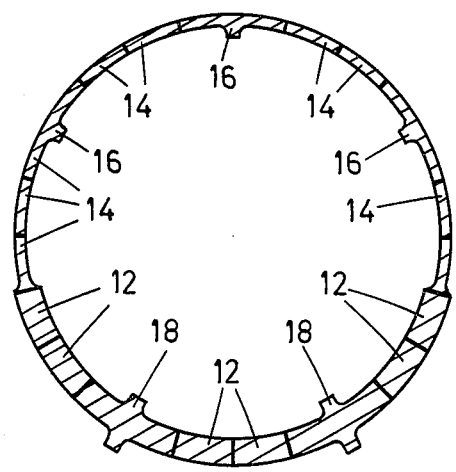
FIG. 4 is a cross-sectional view of a plurality of narrow alloy panels welded together to form a tank.

For instance, FIG. 4 shows a tank shell that could be produced in accordance with this invention and it will be seen that the lower portion of the tank consists of a plurality of heavier guage aluminum panels 12 welded together along their longitudinal edges, and the two outermost panels are welded to a plurality of lighter guage panels 14. Lugs 16 are preferably provided at spaced intervals for baffle connections and lugs 18 may be provided for suspension purposes.

Figure 5:
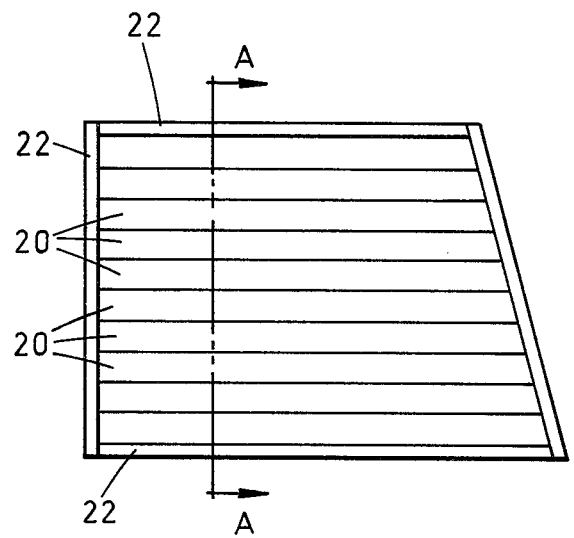
FIG. 5 is a view on an armor component fabricated in accordance with this invention.
Figure 6:
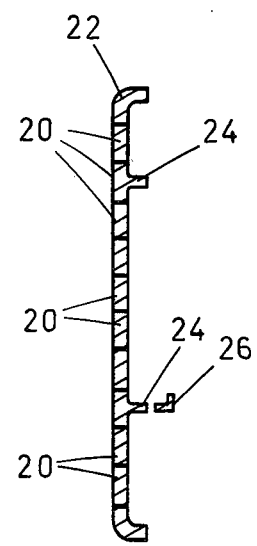
FIG. 6 is a view along A—A of FIG. 5.

Another specific application of this invention is the production of high strength, light weight, weldable aluminum armor plate. In the past it has been difficult or impossible for military applications to utilize the highest strength and consequently most desirable aluminum alloys for armor plate applications, because it has been impossible to arc weld these alloys in the fabrication process and field repair. Consequently, substantial portions of armor plate used of aluminum in recent years has consisted of alloys such as 5083, 5086, and 5454, which are in a medium strength range with ultimate tensile strength of the order of 40,000 to 50,000 pounds per square inch, and which have fairly good ballistic characteristics, and also have excellent arc welding capabilities. It would, however, be much more desirable to utilize higher strength aluminum alloys such as 2024, 7075-T6, 7079-T6, etc. By utilizing the process of the present invention, a plurality of small panels 20 could be fitted together in side by side relationship to form an armor plate section of a vehicle (see FIG. 5). These small panels would be cut from high strength armor plate aluminum alloys (e.g. #71718T6) which have the best ballistic characteristics which are non-weldable by normal techniques. Then, by using the process of the present invention such high strength panels (such as 7079-T6) could be forge welded to strips 22 a more weldable alloy (such as 7005 or 7039-T6 or any other weldable alloy such as 5083 or 5086). After this forge welding operation is completed then the unit will consist of the main body comprising 7079-T6 alloy with a narrow strip 22 of arc-weldable alloy approximately 1 to 2 inches in width around the edge which then makes the plate easy to field fabricate and arc weld in the final assembly of the vehicle. Thus for the major portion of the armored vehicle the maximum protection is obtained for ballistic characteristics and yet the unit itself also possesses good weldability at the edge areas where joints are needed and good, although not the very best ballistic characteristics are likewise obtained at the joint areas. FIG. 6 is a slightly enlarged view along A—A of FIG. 5 and shows how one or more lugs 24 can be provided to permit attachment to other interior members 26.

In cases where it appears desirable to utilize a composite sheet material for armor plate to give the best ballistic characteristics with regard to penetration and shattering of the material upon impact, by utilizing the process of this invention it is possible to lay several sheets together to form a composite as required before actually forge welding the weldable strip about the outer edge. In this manner sandwiched panels of different materials and alloys can readily be prepared and made into a homogeneous structure by the forge welded ring around the outside of the part.

If it were desirable to obtain equivalent ballistic characteristics at the joint areas to the main plate then the portion which is forge welded to the plate proper can be made of greater thickness to compensate for the ballistic properties of the weldable strips. In this manner, armored vehicles can be built, either of the same weight as at the present time but with improved ballistic properties or lighter weight equipment can be fabricated with the same ballistic characteristics resulting in higher speed and longer range equipment.

The present invention is also particularly suited for the fabrication of structuralllly reinforced panels. There have been a number of commercial and industrial applications where it has been desirable to obtain extruded shapes and structural panels of greater width than is possible in existing extrusion presses. For example, using even the largest aluminum extrusion presses in existance today, the maximum width which can be obtained in an extruded panel is somewhat less than 30 inches and in most cases does not exceed 24 inches in width. Thus, for example, in the fabrication of wing panels for aircraft, floor decking for transportation equipment, building panels and like products, the design and use of these products is limited to the size of extrusions which can be produced. As a result, for example, in the aircraft industry, it has been necessary to take large area plates of aluminum three or four inches in thickness or greater and approximately seven to eight feet in width and machine out of this plate a structurally reinforced section which would end up with a thickness of the plate material of the order of ¾ inch and integral with this plate stiffening members in the form of tees or angles which give the plate the necessary rigidity strength and structural properties.

By utilizing the process of the present invention it is possible to make such panels of even greater width than those already manufactured from plate and also eliminate the machine operation by starting with extruded panels in the high strength alloys required, such as 7075-T6, 2014 or 2024 alloys. These standard extrusion panels need only be approximately 1 foot in width from a standard extrusion press, consequently, not limiting itself to the capacity of the maximum large extrusion presses of which there are only a few available. These extruded planks can then be forge welded together using the process of this invention to produce a panel which is essentially as good as the one piece panel fabricated and machined at great expense from a large plate. Since the weld properties are similar to those of the parent material and since there is substantially no limitation to the width of plate which can be made in this manner, this allows a capability of producing large aluminum structurally integral stiffened panels, for architectural applications, transportation equipment applications, and military applications which are not possible by any other process and yet possess the inherent properties of a unit panel sculptured out of plate. For example, applications of this method of manufacturing panels can be utilized for fabricating sections of dump trailer side panels and floor sheets, van trailer floor sheets of high strength alloys which will be light in weight and of the highest strength alloys, wing panels for aircraft, skin sections for missiles and floor panels for architectural and structural applications.

Figure 7:
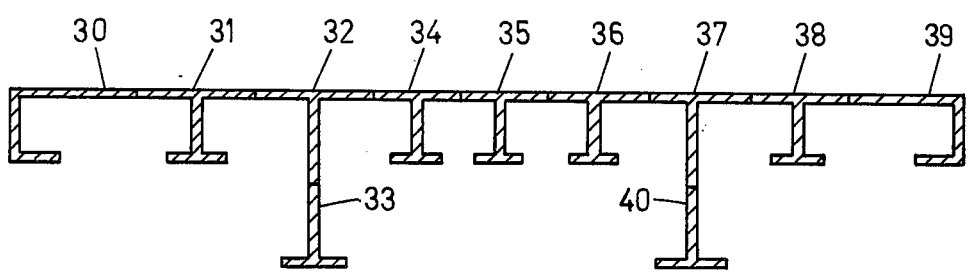
FIG. 7 is a cross-sectional view of a flatbed trailer fabricated in accordance with this invention.

FIG. 7 illustrates how a plurality of relatively narrow panel sections 30-40 may be welded together in accordance with the method of this invention to form the flatbed of a truck or trailer.

The present invention is also quite useful in connection with fabricating aluminum or magnesium stock of extreme width and in a wide variety of high strength alloys. The present method of manufacturing aluminum plate and sheet limits the size of the sheet which can be made to the width of the largest rolling mill, which is approximately 110 inches in width. In applications where plates of greater width than this is required, particularly in a high strength alloy, it has not been possible to produce them on existing plant equipment. However, by utilizing the process of the present invention several plates can be taken and forge welded together in such a manner as to produce properties at the joint area which are equivalent in practically all respects to the properties of the parent material and as a result of this invention makes it possible to produce and market plate products which are considerably wider than is presently possible with existing equipment. Applications of this type are particularly valuable in the aerospace industry as well as for other commercial applications.

Such large plate sections have also been limited to the maximum billet size available to the rolling mill and here again this can be extended to substantially larger sizes both of length and width by utilizing the instant process and still maintain the excellent properties and characteristics of the parent material in the joint areas. Furthermore, such large plate sections need not start from rolled plate but might also be fabricated from extruded sections as indicated above and possibly on a more economical basis, depending somewhat upon the gauge and width.

Another similar application is in the fabrication of reroll stock of high strength alloys. Practically all reroll stock and medium gauged sheet and plate has been manufactured by standard rolling mill processes. Recently a process was developed which makes it possible to produce reroll stock in widths upwards of four feet by continuous casting of molten aluminum into a mold producing plate material on the order of ¼ inch to 178 inch in thickness which then could be moved onto a reroll stage and rolled to thinner gauge sheet and plate. The rate of production of this reroll stock on a machine such as this is approximately 4 feet per minute and is limited to the low strength alloys but does, however, have the advantage that small fabricators can produce their own reroll stock competitively with reroll stock obtained from large companies at a much smaller capital investment.

A similar product can be made utilizing an extrusion press and the processs of the present invention at approximately the same cost as has been obtained with these direct casting machines except that by using our process in conjunction with an extrusion press it is possible to obtain a greater width of material than has been possible with the direct casting process and also a wider variation of thickness of the material and alloy can be obtained at greater fabricating speeds. Such reroll stock can be fabricated by our process at a rate of approximately ten to twelve feet per minute in any aluminum alloy and the product produced is not only done at approximately the same cost and at a higher speed but actually has a wrought structure and consequently is equivalent to a reroll stock or plate produced at a large rolling mill with a substantially smaller capital investment.

The teachings of this invention, while being particularly applicable to high strength aluminum and magnesium alloys and aluminum and magnesium alloys of large cross-sectional area, are also equally applicable to certain other alloys, and particularly to the alloys of titanium, zirconium, beryllium, and certain alloy steels.

While we have described what we consider to be the most advantageous embodiments of this invention, it is evident that various modifications can be made in the specified procedures set forth without departing from the purview of this invention.

What we claim as new and desire to protect by Letters Patent of the United States is:

1. A method for uniting by pressure welding opposed elongated edge faces of two plate sections of high strength aluminum alloy, high strength magnesium alloy or combinations thereof, said high strength aluminum alloy being selected from the group consisting of aluminum alloys which bear the standard metallurgical destinations:

2011, 2014, 2017, 2117, 2018, 2218, 2618, 2219, 2024, 2025, 3003, 5052, 5252, 5652, 5154, 5254, 5454, 5155, 5056, 5356, 5456, 5257, 5457, 5557, 5657, 5083, 5086, 6101, 6201, 6003, 6011, 6151, 6951, 6053, 6253, 6061, 6062, 6262, 6063, 6463, 6066, 7001, 7039, 7072, 7075, 7076, 7277, 7178, 7079, and said high strength magnesium alloy selected from the group having one of the following compositions:

a 3.0% aluminum, 1.0% zinc, remainder magnesium;

b. 6.5% aluminum, 1.0% zinc, remainder magnesium;
c. 5.7% zinc, 0.55% zirconium, remainder magnesium;
d. 3% aluminum, 0.45% manganese, 1.0% zinc, remainder magnesium, which comprises the steps: tapering the elongated edge faces, aligning said faces with each other, said faces being clean of deleterious foreign matter, quickly heating the faces of said two sections to a temperature within the range of from 200° to 450° F. to enhance plastic flow of the alloy, and immediately thereafter pressure welding said sections together by forcing said clean and heated faces together under a pressure in excess of 75,000 pounds per square inch of cross-sectional area to upset the alloy in a lateral direction in an amount sufficient to cause a substantial increase in the area of the interface between the two sections of from about two to less than four times the original area whereby heating and pressure welding the faces of the sections together is completed within one minute to avoid overaging, recrystallization or partial annealing of the alloy.

2. A method as claimed in claim 1, in which each of said tapered edge faces has a length less than the thickness of the section welded.

3. A method as claimed in claim 1, in which said temperature is in the range of from 350° to 450° F.

* * * * *